United States Patent [19]
DeMario et al.

[11] Patent Number: 5,479,464
[45] Date of Patent: Dec. 26, 1995

[54] EXPANDABLE TOP NOZZLE AND DEVICE FOR SECURING SAME TO A NUCLEAR FUEL ASSEMBLY

[75] Inventors: Edmund E. DeMario; Charles N. Lawson; Raymond G. Zakrzwski; Ivan Klima, all of Columbia, S.C.

[73] Assignee: Westinghouse Electric Corporation, Pittsburgh, Pa.

[21] Appl. No.: 298,503

[22] Filed: Aug. 30, 1994

[51] Int. Cl.$^6$ .................................................. G21C 5/06
[52] U.S. Cl. ............................................ 376/364; 376/446
[58] Field of Search .................................. 376/364, 446, 376/434, 362

[56] References Cited

U.S. PATENT DOCUMENTS

| | | | |
|---|---|---|---|
| 4,534,933 | 8/1985 | Gjersten et al. | 376/364 |
| 4,641,409 | 2/1987 | Shallenberger et al. | 376/446 |
| 4,687,619 | 8/1987 | Wilson et al. | 376/446 |
| 4,687,630 | 8/1987 | Gjertsen et al. | 376/446 |
| 4,702,882 | 10/1987 | Stucker | 376/446 |
| 4,986,959 | 2/1991 | Sparrow et al. | 376/446 |

Primary Examiner—Daniel D. Wasil

[57] ABSTRACT

An expandable top nozzle for a nuclear fuel assembly having zircaloy thimble tubes has a cylindrical barrel and an assembly slidable in the barrel which includes a hub and a thin rod ejection plate fixed in spaced relation to the hub by support tubes through which the control rods extend. The support tubes extend through the hub and a spring retainer plate biased against an annular shoulder in the barrel by helical compression springs concentrically mounted with the support tubes in counterbores in the hub and spring retainer plate. A centrally located instrument guide robe has a spring loaded plunger which extends through the spring retainer plate and sets the height of an RCCA below the top of the barrel despite expansion and compression of the nozzle with changes in thimble robe length relative to the other internals. The top nozzle is removably attached to a fuel assembly by tubular inserts fixed to the thimble robes and having collapsed fingers with an annular outward bulge adjacent the free end. With the collapsed fingers inserted in the apertures in the rod ejection plate, lock tubes are pushed through the support tubes to spread the collapsed fingers of the inserts into engagement with circumferential grooves in the apertures.

11 Claims, 7 Drawing Sheets

EXPANDABLE TOP NOZZLE AND DEVICE FOR SECURING SAME TO A NUCLEAR FUEL ASSEMBLY

BACKGROUND OF THE INVENTION

1. Field of the Invention

This invention relates to top nozzles for nuclear fuel assemblies which accommodate for differences in thermal expansion and irradiation growth of fuel assemblies and other reactor components, and in particular, to a retrofit expandable top nozzle for use in reactors previously having components composed of essentially the same materials. The invention also relates to a device for securing an expandable top nozzle to a fuel assembly.

2. Background of Information

In nuclear reactors of the type designed in the former Soviet Union, the reactor core is comprised of a large number of elongated fuel assemblies each having a plurality of fuel rods held in an organized hexagonal array by a plurality of grids spaced longitudinally along the fuel rods and secured to stainless steel control rod guide thimbles. The stainless control rod guide thimbles extend above and below the ends of the fuel rods and are attached to top and bottom nozzles, respectively. The fuel assemblies are arranged in the reactor vessel with the bottom nozzles resting on a lower core plate. An upper core plate rests on the top nozzles.

The top nozzles in the Soviet design are non-removably fixed to the stainless steel control rod guide thimbles of the fuel assembly. These complex nozzles perform several major functions. First, they position the remote control cluster assembly (RCCA) relative to the guide tubes within the core so that the position of the RCCA relative to the upper core plate is fixed. The RCCA positions the control rods which are inserted into the fuel assembly as a group or cluster.

The Soviet nozzle also dampens the velocity of the control rods using a spring to remove energy when the rods are dropped into the reactor core during an emergency shutdown. The nozzle also supplies spring loads for supporting the internals. When the upper core plate is lowered onto the nozzles, it compresses the nozzle spring. In addition, the Soviet nozzle is designed to protect the control rods when the fuel assembly is removed from the reactor vessel. Under these conditions, the RCCA is at or below the top edge of the nozzle. Finally, the Soviet design of the top nozzle allows the fuel assembly to be handled when lifted out of the core by transferring the loads through the nozzle.

Thus, the Soviet nozzle is designed to function in two positions; free and compressed. As stainless steel is used for the thimbles of the Soviet fuel assembly, the relative separation between the interior of the reactor vessel and the fuel assemblies remains constant once the assembly is in position. Spring loads are such that the nozzles can support the internals, and the spring loads as well as the RCCA positions are fixed so that all functions are static. As a result, the nozzle has built-in references around which the internals are designed.

The stainless steel thimbles used in the Soviet design impose higher reactivity cost on the fuel assemblies, and they are more difficult to attach to the grids of the fuel assemblies. Non-Soviet fuel assemblies utilize zircaloy for the thimbles which imposes less reactivity cost. However, zircaloy has a different constant of thermal expansion than the stainless steel reactor vessel, and grows during irradiation. Expandable top nozzles which accommodate for these variations in the dimensions of different components within the reactor, are disclosed in, for example, U.S. Pat. Nos. 4,534,933; 4,687,619; 4,702,882 and 4,986,959. Such nozzles, however, are used in reactors in which the top core plate rests on a core support in the form of a circumferential ledge within the reactor vessel. In the Soviet-type, reactor, the core plate rests on and is supported by the top nozzles.

As mentioned, the Soviet design top nozzle is permanently attached to the thimble tubes of the fuel assembly. The above-mentioned patents disclose removable top nozzles. U.S. Pat. No. 4,641,409 discloses a method for attaching a replacement nozzle in which the thimble sleeve is circumferentially bulged into an annular groove in the adapter plate of the replacement nozzle. In another design, insert sleeves are secured to the ends of the guide thimbles. Each insert has an annular outwardly extending bulge or rib adjacent its free end and is slotted from its free end to form flexible fingers. These flexible fingers deflect when the insert is inserted into the apertures in the adapter plate and then expand outward to engage the annular rib or bulge in the annular groove in the adapter plate bore. Lock tubes are inserted inside the insert to maintain engagement of the annular rib or bulge and the groove of the adapter plate.

In order to remove the nozzles, such as to replace damaged fuel rods, the lock tube is removed and the adapter plate and fuel assembly are pulled apart. Removal of the top nozzle with a slotted insert has been difficult because the forces required to disjoint the nozzle from the fuel assembly have occasionally been excessive. As such replacement of the fuel rods is typically performed during a critical path refueling outage, any difficulty in removing the nozzle results in higher cost to the reactor operator. In addition, once the top nozzle is removed, the protruding inserts are left exposed to rod replacement tooling, subjecting the inserts to possible damage, although actual frequency of damage from replacement tooling is low. Also, each of the lock tubes must be removed individually and each tube requires a separate inspection prior to replacement.

There is a need for an improved removable top nozzle and the mechanism for securing the same to a nuclear fuel assembly.

More particularly, there is a need for an improved top nozzle of the Soviet design which is removable.

There is a further need for such an improved top nozzle which can be used with a fuel assembly having zircaloy guide thimbles.

There is a further need for such an improved top nozzle which otherwise maintains all the functions of the Soviet-type top nozzle.

There is another need for such a top nozzle which has reduced hydraulic resistance.

There is an additional need for an improved device for removably securing the top nozzle to the fuel assembly guide thimbles.

More particularly, there is a need for such an improved locking device which has low insertion and withdraw forces, yet firmly locks the nozzle to the fuel assembly.

SUMMARY OF THE INVENTION

These and other needs are satisfied by the invention which is directed to an expandable top nozzle for a nuclear fuel assembly which includes a cylindrical barrel having a first end on which the upper core plate seats, and having an annular internal shoulder facing a second end. The expandable nozzle further includes a subassembly comprising a hub slidable in a second end of the barrel, a rod ejection plate and support tubes rigidly securing the rod ejection plate to the barrel in fixed, axially aligned, spaced relation. The rod ejection plate has through apertures aligned with the support tubes. A spring retainer plate is slidable in the barrel between the internal shoulder and the hub. First biasing means, preferably in the form of helical compression springs, located between the spring retainer plate and the hub bias the spring retainer plate and hub apart from a compressed toward an expanded condition. In addition, an RCCA/ instrument guide assembly extends centrally through the rod ejection plate, the hub and the spring retainer plate and sets a fixed position for the RCCA from the core plate. With the rod ejection plate fixed to the hub by the support tubes, the loads for lifting the fuel assembly by the top nozzle and the compression forces generated with the upper core plate in place, are directed straight through the rod ejection plate between the support tubes and the guide thimbles, and therefore the rod ejection plate can be made thinner allowing more room for expansion and contraction.

The RCCA/instrument guide assembly more particularly includes an instrument guide tube extending through the rod ejection plate, the hub and a central bore in the spring retainer plate. A plunger on the instrument guide tube is slidable in the central bore in the spring retainer plate. Second biasing means, also preferably in the form of a helical compression spring, and located between the: hub and the spring retainer plate preloads the plunger. Cooperating means on the plunger and the spring retainer plate set the fixed position for the RCCA. This cooperating means in one embodiment takes the form of a shoulder on the plunger which engages a confronting surface on the spring retainer plate which may be either an annular shoulder inside the central bore, or the face of the spring retainer plate surrounding the central bore. In yet another embodiment, posts attached to the end of the plunger bear against the upper core plate to set the position for the RCCA. Adjustable means may be provided on the instrument guide tube, such as a nut which bears against the exterior of the hub, to set the preloading on the RCCA/instrument guide assembly.

As another aspect of the invention, improved means is provided for removably securing a top nozzle to the thimble tubes of a fuel assembly. A tubular insert fixed to the end of the thimble tube has at least two slots extending axially from the free end to form fingers. An annular outwardly extending bulge is provided on the fingers which are then bent inward so that the insert passes freely into an aperture in the nozzle rod ejection plate. A locking tube is then inserted through the support tube of the nozzle to expand the normally collapsed insert so that the annular bulge engages and is locked into the circumferential groove in the aperture in the, rod ejection plate. Preferably, the fingers are flared outwardly at the free end to serve as a lead in for the locking tube.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
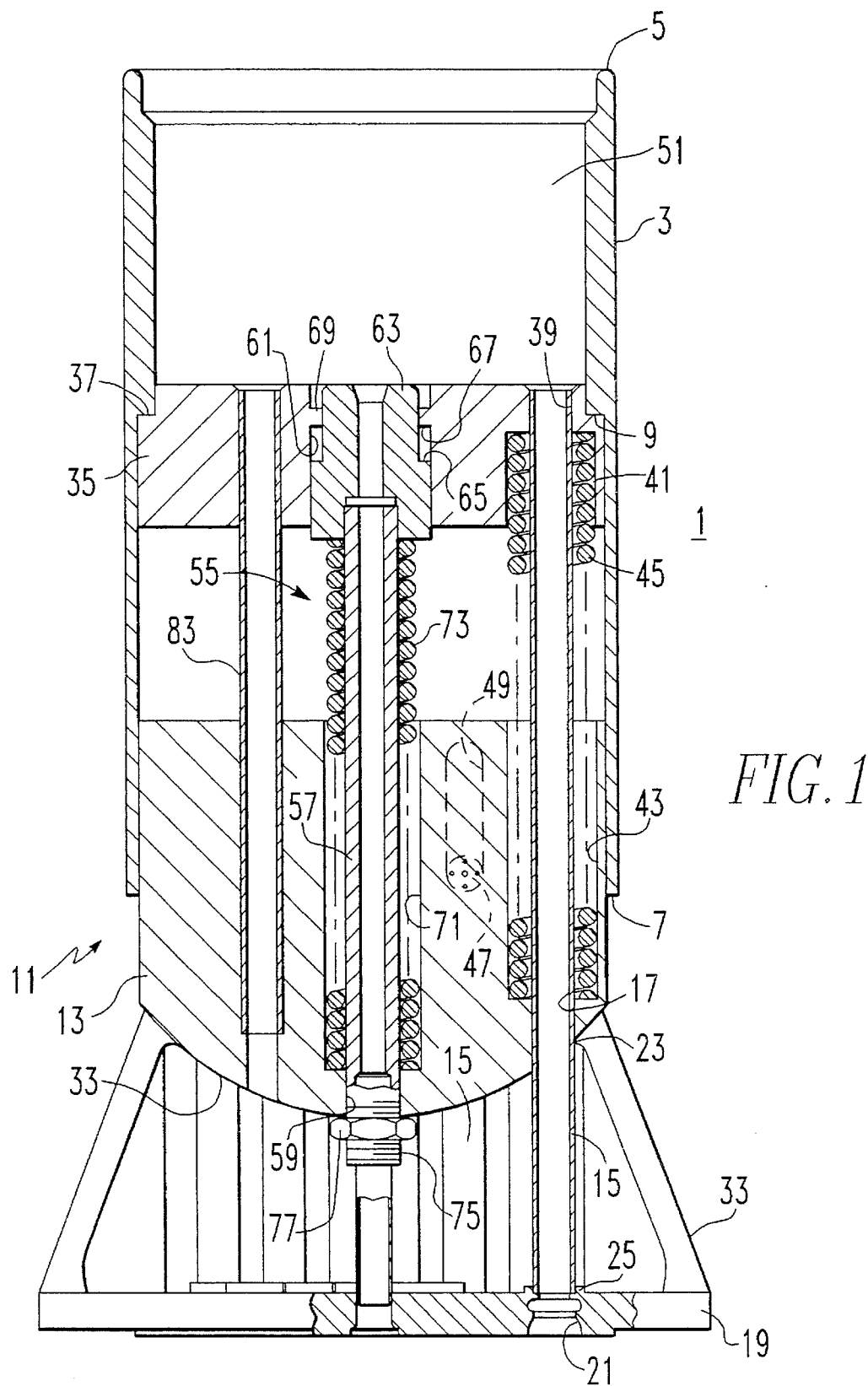
FIG. 1 is a longitudinal sectional view of a removable top nozzle in accordance with a first embodiment of the invention.
Figure 2:
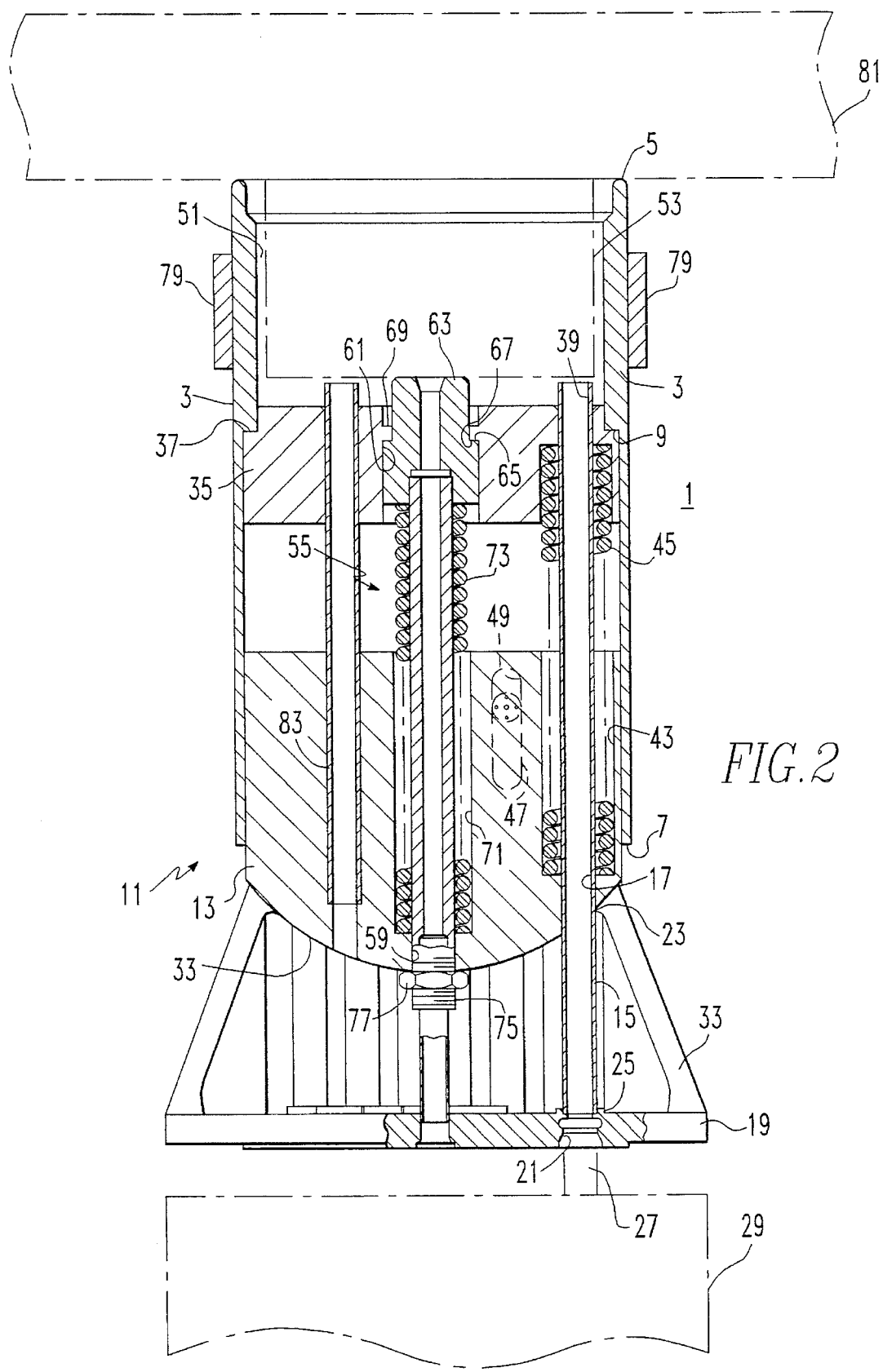
FIG. 2 is a longitudinal section illustrating the compressed position of the removable top nozzle of FIG. 1 between a fuel assembly and the core plate of a nuclear reactor.
Figure 3:
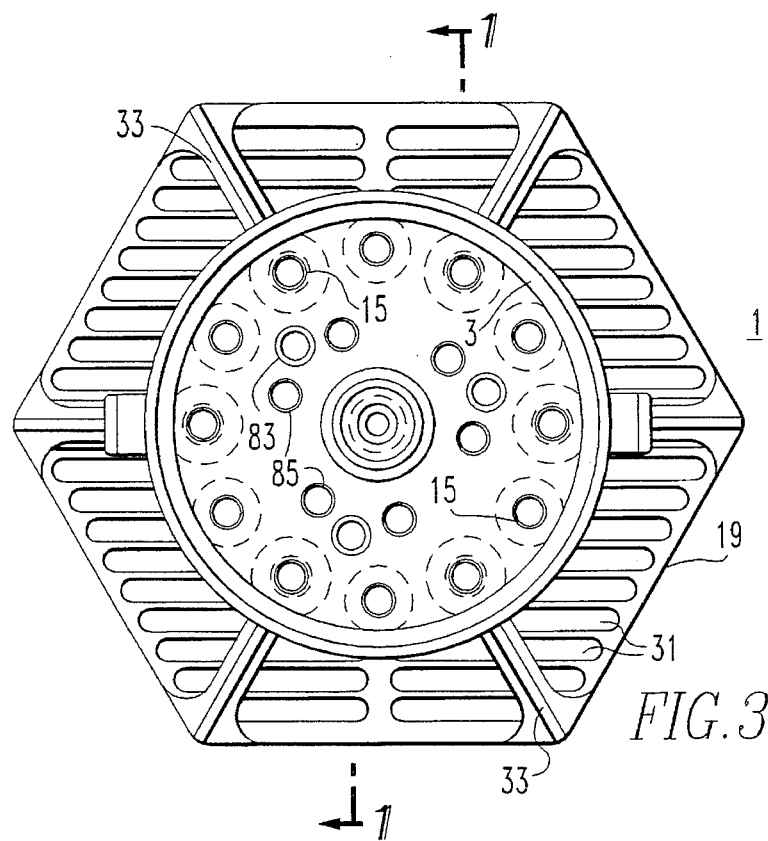
FIG. 3 is a top plan view of the removable top nozzle of FIGS. 1 and 2.

Referring to FIGS. 1–3, the expandable, removable top nozzle 1 of the invention comprises a cylindrical barrel 3 having a first, top end 5 and a second bottom end 7. The barrel 3 has an internal, annular downwardly facing shoulder 9.

An assembly 11 includes a hub 13 slidable in the second end 7 of the barrel 3. The assembly 11 further includes 12 support tubes 15 extending through angularly spaced apertures 17 around the periphery of the hub 13. The support tubes 15 extend below the hub 15. A hexagonal rod ejection plate 19 has apertures 21 aligned with the support tubes 15. The support tubes are fixed to the hub 13 such as by brazing at 23 and to the rod ejection plate 19 such as by brazing by 25. Thus, the support tubes 15 secure the rod ejection plate 19 to the hub 13 in fixed spaced relation. The support robes 15 are made of a high corrosion resistant material such as stainless steel. As can be seen from FIG. 2, the top nozzle 1 is secured to thimble tubes 27 on a fuel assembly shown schematically at 29. As the support tubes are fixed to the hub 13 and rod ejection plate 19 and are aligned with the thimble tubes 27, they take the loading in compression when the fuel assembly and top nozzle are in place in a reactor, and take the loading in tension when the fuel assembly is lifted by the top nozzle. Thus, the rod ejection plate 19, which as can be seen in FIG. 3 has a number of coolant flow openings 31, can be thinner than in the prior Soviet top nozzle where the loads were transmitted across the rod ejection plate. The thinner rod ejection plate 19 allows more room for differential expansion and contraction of the parts brought about by the use of materials such as zircaloy for the thimble tubes 27 and support tubes 15 in place of stainless steel. Legs 33 cast with the hub 13 and rod ejection plate 19 serve as deflectors for adjacent fuel assemblies and add strength to the assembly 11. The lower end of the hub 13 is domed at 33 to reduce fluid resistance for the coolant.

A spring retainer plate 35 is slidable in the barrel 11, and has an annular shoulder 37 which seats against the shoulder 9 in the barrel. The support tubes 15 are slidable in apertures 39 in the spring retainer plate 35. These apertures 39 and the aperture 17 in the hub 13 are counterbored at 41 and 43, respectively, to form seats for helical compression springs 45 which bias the spring retainer plate 35 and the assembly 11 apart. A pin 47 threaded into the side of the hub 13 is engaged by a longitudinal slot 49 in the barrel 3 to retain the assembly 11 within the barrel.

With the spring retainer plate 35 seated against the shoulder 9 in the barrel 3, a recess 51 is formed near the upper end of the nozzle 1 for accommodating an RCCA shown schematically at 53 (see FIG. 2). An RCCA/instrument guide assembly 55 includes an instrument guide tube 57 which extends through a central bore 59 in the hub 13 and into a central bore 61 in the spring retainer plate 35. A plunger 63 secured to the upper end of the instrument guide tube 57 is slidable in the bore 61 and has an annular peripheral shoulder 65 which confronts, as shown in FIG. 2 in the compressed position of the nozzle, and seats against a circumferential shoulder 67 formed by a rib 69 in the bore 61. The bore 59 in the hub 13 is counterbored at 71 to receive a helical compression spring 73 which bears against the plunger 63. The instrument guide tube 57 is slidable in the bore 59 and is threaded at 75 below the dome 33. An adjustment nut 77 screwed onto these threads 75 sets the preloading on the plunger 63. The instrument guide tube 57 provides a passage for instrumentation (not shown) which extends through the top nozzle and down into the fuel assembly.

As shown in FIG. 2, the top nozzle is removably secured to the fuel assembly 29. The fuel assembly is lifted by the top nozzle through a pair of lugs 79 the position diametrically apart on the barrel 3. When positioned within a reactor vessel, the upper core plate 81 is lowered onto and supported by the top nozzles 1. The weight of the core plate 81 compresses the top nozzle 1 from the expanded position shown in FIG. 1. In the compressed position of FIG. 2, the spring retainer plate 35 remains a fixed distance below the top of the barrel 3 as determined by the confronting shoulders 9 and 37. The plunger 63 extends upward above the spring retainer plate 35 by a distance determined by the location of the shoulders 65 and 67. Thus, the plunger 63 establishes a fixed position for the RCCA 53 in relation to the upper core plate 81. The assembly 11, biased downward by the springs 45 slides relative to the barrel 3 to accommodate for the differential initial contraction upon heating of the confronting thimble tubes 27 of the fuel assembly and their eventual irradiation growth. Three angularly spaced flow tubes 83 extend through the spring retainer plate 35 and the hub 13 to allow coolant to flow through the top nozzle. Six interior support guide tubes 85 for control rods are angularly spaced around the instrumentation guide tube 57 inside the support tubes 15 (see FIG. 3).

Figure 4:
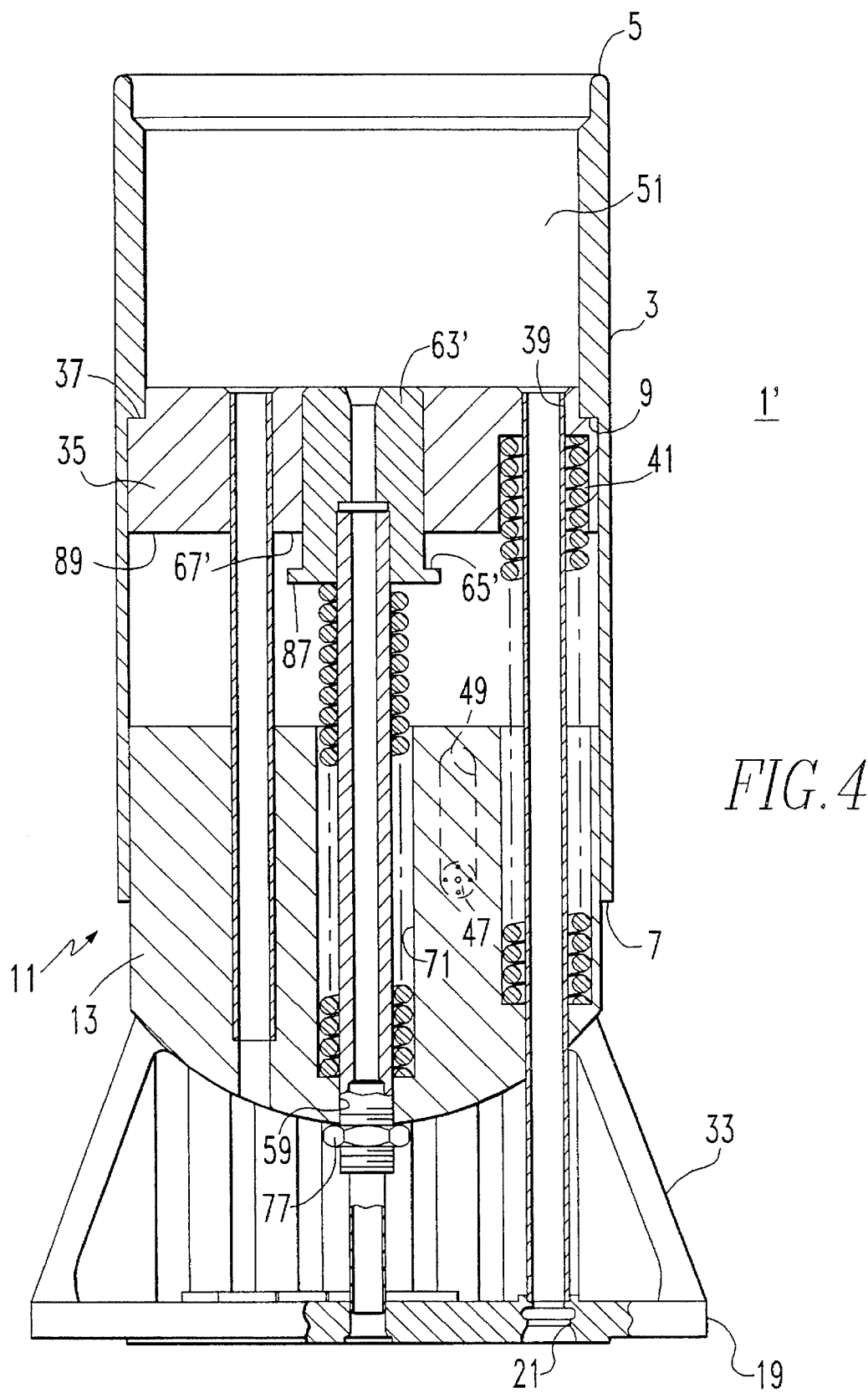
FIG. 4 is a longitudinal section view similar to that of FIG. 1 illustrating a second embodiment of the removable top nozzle in accordance with the invention.

FIG. 4 illustrates another embodiment of the expandable, removable top nozzle in accordance with the invention. Parts which are modified are identified with a primed reference character. In the nozzle 1' shown in FIGS. 4 and 5, the shoulder 65' on the plunger 63' is formed by an annular flange 87 at the lower end of the plunger which engages the shoulder 67' formed by the bottom face 89 of the spring retainer plate 35.

Figure 6:
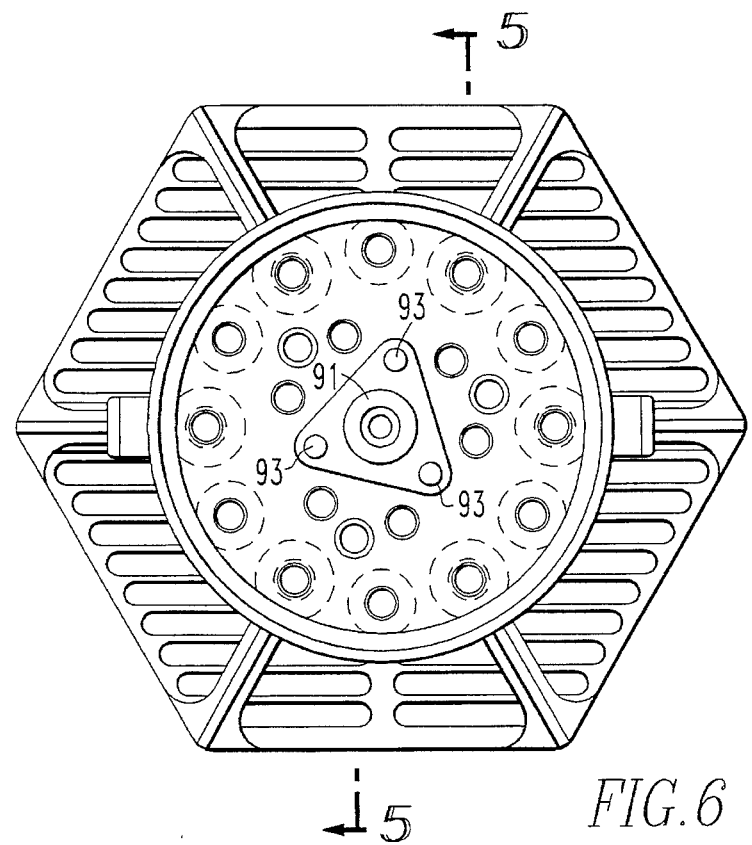
FIG. 6 is a top plan view of the removable top nozzle of FIG. 5.
Figure 5:
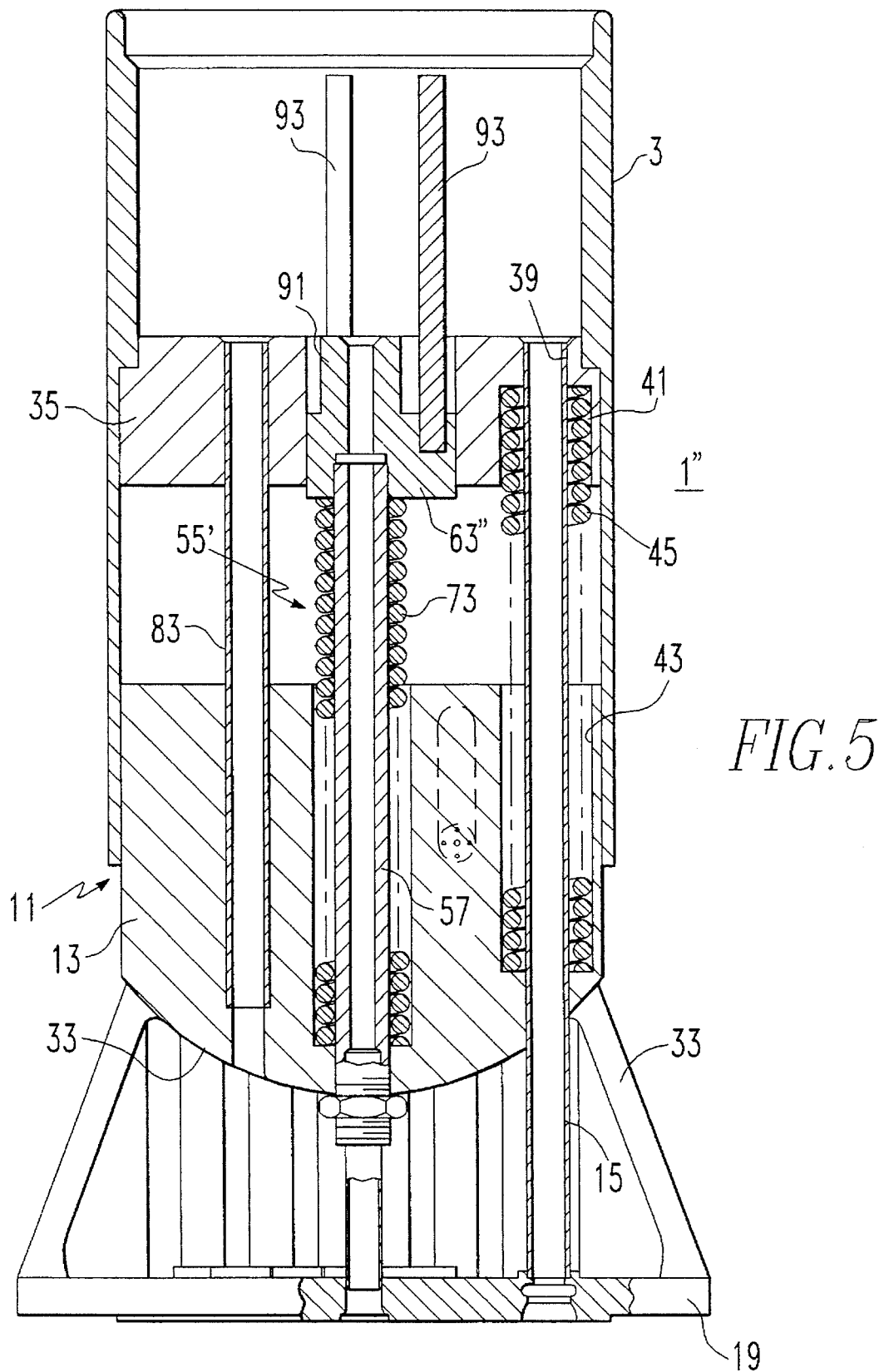
FIG. 5 is a longitudinal sectional view similar to that of FIG. 1 showing yet another embodiment of the invention.

FIGS. 5 and 6 illustrate a third embodiment of an expandable, removable top nozzle 1" in accordance with the invention. Again, identical parts are identified with the same reference characters as used in the first two embodiments, while modified components are identified with double primed reference characters. The plunger 63" has a center portion 91 which supports the RCCA. Three posts 93 speed 120° apart extend upward and bear against the bottom of the upper core plate 81 when in place to fix the position of the RCCA relative to this upper core plate 81.

Figure 8:
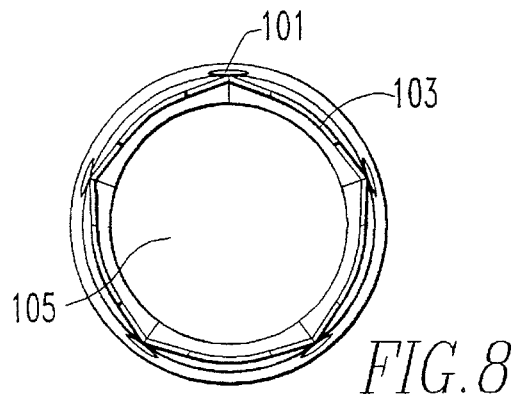
FIG. 8 is an end view of the insert of FIG. 7.
Figure 7:
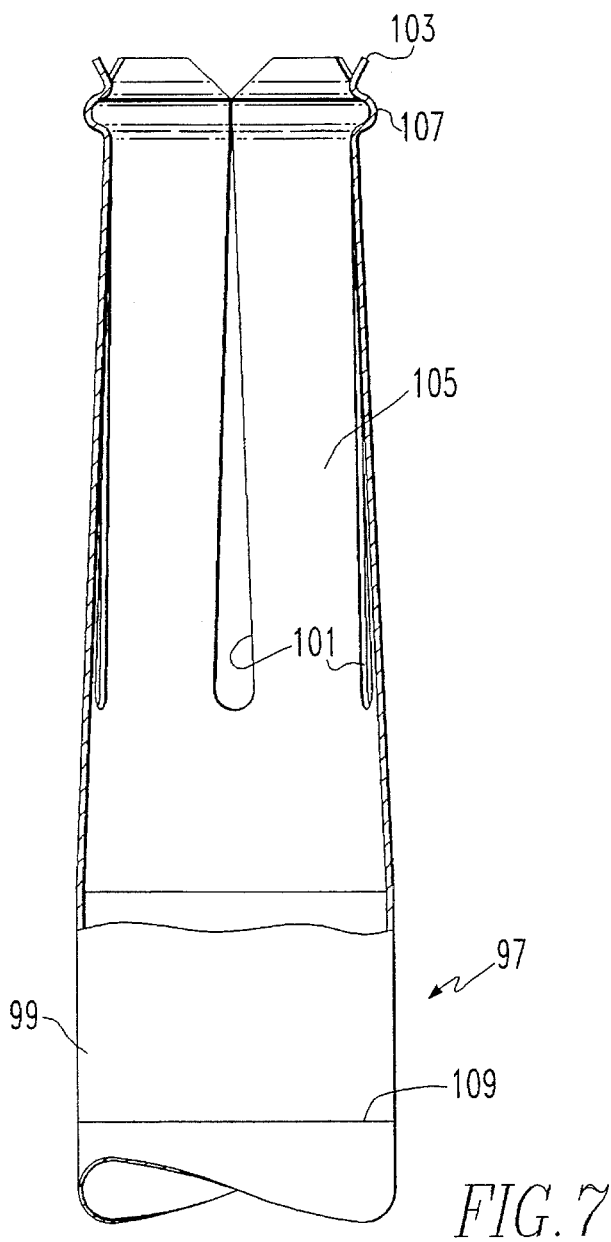
FIG. 7 is a side view, partially in section, of a locking insert in accordance with the invention used to secure the top nozzle to a fuel assembly.
Figure 9:
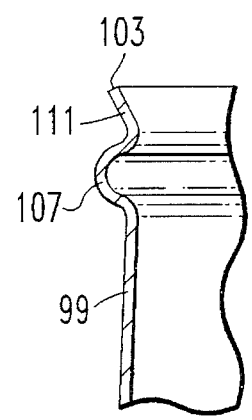
FIG. 9 is a fragmentary view in enlarged scale of a portion of the locking insert of FIG. 7.

The invention also embraces a connection for removably attaching the nozzle 1 to the thimble tubes 27 of a fuel assembly 29. As shown in FIGS. 7–9 the releasable connection 97 includes a collapsed insert 99. This collapsed insert 99 is a section of stainless steel tubing which has a number of angularly spaced slots 101 extending longitudinally frown a free end 103 to form a number of fingers 105. In the exemplary insert 99, five fingers 105 are formed. An annular outwardly extending bulge 107 is formed in the fingers 105 spaced from the end 103. The fingers 105 are bent inward as shown in FIG. 8 such that the outer diameter of the annular bulge 107 is no greater than the outer diameter of the insert tube at the second end 109. As shown in FIG. 9, the free end 103 is flared outward at 111.

Figure 10:
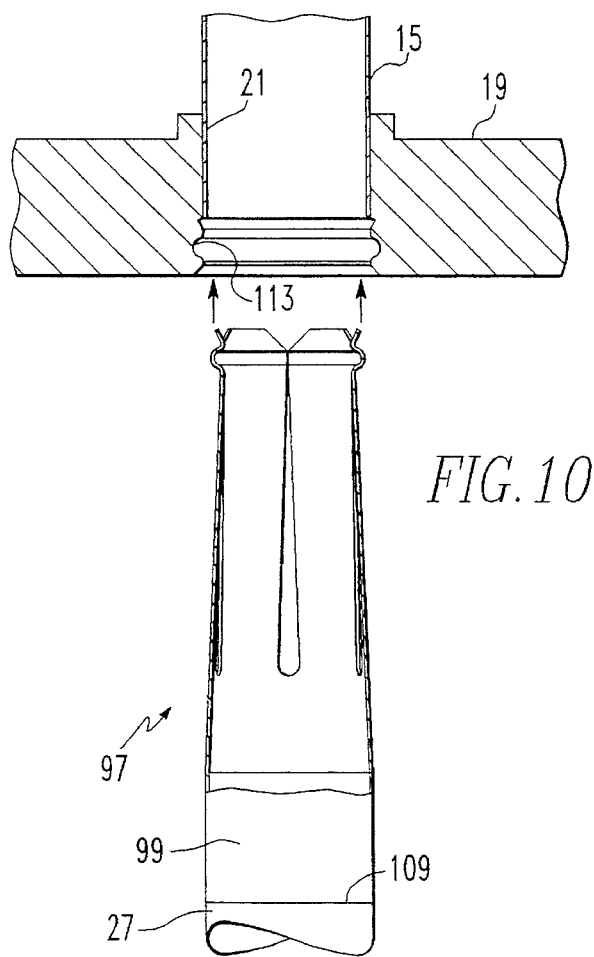
FIG. 10 is a sectional view showing placement of the locking insert in position for locking a top nozzle of the invention to the thimble tube of a fuel assembly.
Figure 11:
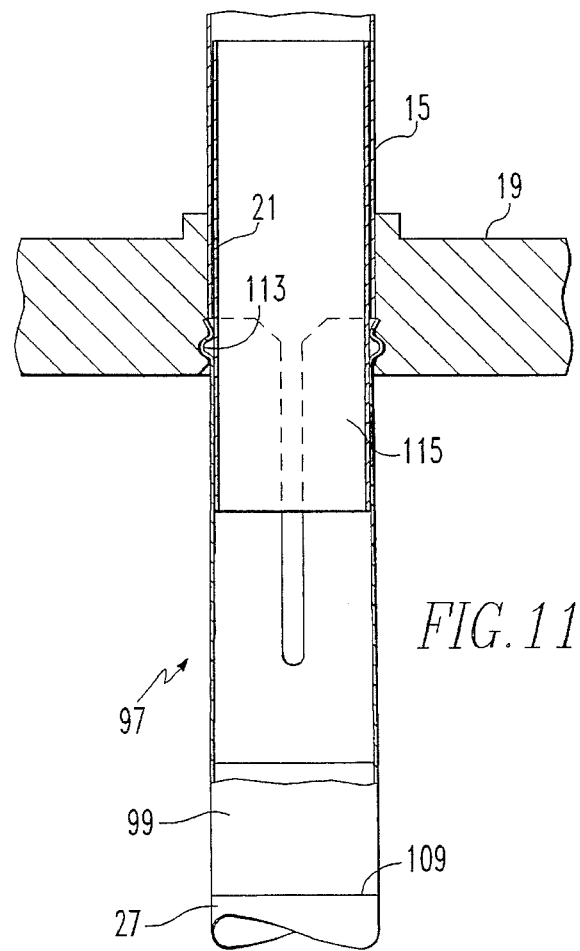
FIG. 11 is a view similar to FIG. 10 showing; the locking insert locked in place.

To removably connect the top nozzle I to a fuel assembly 29, the second end 109 of the collapsed insert 99 is bulged to the thimble tube 27 extending upward from the fuel assembly as shown in FIG. 10. The collapsed insert 97 is then inserted into a bore 21 in the rod ejection plate 19 which has a circumferential groove 113. A lock tube 115 having an outer diameter slightly less than the inner diameter of the support tube 15 is inserted through the support tube 15 and engages the flare 111 on the collapsed insert to spread the fingers radially outward into engagement with the groove 113. When the nozzle 1 is to be removed from the fuel assembly 29, a tool (not shown) is inserted through the support tube 15 and engages the lower end of the lock tube 115. The lock tube 115 is then pulled clear of the insert 99 which collapses so that the nozzle can be removed with minimal force required. This locking device 97 firmly locks the nozzle to the fuel assembly yet allows it to be removed with minimal force applied. Therefore, fewer of these locking devices are required than in the past which reduces the time required to reconstitute a fuel assembly.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An expandable top nozzle for a nuclear fuel assembly positioned below a top core plate and having thimble tubes extending upward therefrom in which control rods supported by a rod control cluster assembly (RCCA) are slidable, said nozzle comprising:

a cylindrical barrel having a first end on which said core plate seats, and having an annular internal shoulder facing a second end;

an assembly comprising a hub slidable in said second end of said barrel, a rod ejection plate, and support tubes rigidly securing said rod ejection plate to said hub in fixed axially aligned spaced relation, said rod ejection plate having apertures there through aligned with said support tubes;

means for securing said thimble tubes in said apertures in said rod ejection plate in alignment with said support tubes;

a spring retainer plate slidable in said barrel between said shoulder and said hub;

first biasing means between said spring retainer plate and said hub biasing said spring retainer plate and said hub apart from a com, pressed toward an expanded condition of said nozzle; and an RCCA/instrument guide assembly extending centrally through said rod ejection plate, said hub and said spring retainer plate and setting a fixed position for said RCCA from said core plate within said barrel between said first end and said spring retainer plate.

2. The nozzle of claim 1 wherein said hub has a domed configuration facing said rod ejection plate, and wherein said rod ejection plate has openings therethrough for fluid passage.

3. The nozzle of claim 1 wherein said RCCA/instrument guide assembly comprises an instrument guide tube extending through said rod ejection plate, said hub and a central bore in said spring retainer plate, a plunger fixed on said instrument guide tube and slidable in said central bore in said spring retainer plate, second biasing means between said hub and said spring retainer plate applying a preload to said plunger, and means associated with said plunger for setting said fixed position for said RCCA.

4. The nozzle of claim 3 wherein said means associated with said plunger for setting said fixed position of said RCCA comprises a shoulder on said plunger facing toward said first end of said barrel and a confronting surface on said spring retainer plate facing toward said second end of said barrel.

5. The nozzle of claim 4 wherein said confronting surface on said spring retainer plate is an annular shoulder within said central bore.

6. The nozzle of claim 4 wherein said confronting surface is an end face of said spring retainer plate surrounding said central bore.

7. The nozzle of claim 3 wherein said means associated with said plunger for setting said fixed position of said RCCA comprise posts mounted on said plunger which bear against said upper core plate to set said fixed position for said RCCA.

8. The nozzle of claim 3 wherein said second biasing means is a helical compression spring: and wherein said instrument guide tube has adjustment means between said hub and said rod ejection plate for adjusting extension of said instrument guide tube through said spring retainer plate with said nozzle in said expanded condition.

9. The nozzle of claim 7 wherein said adjustment means comprises a thread on said instrument guide tube between said hub and said rod ejection plate and an adjustment member engaging said threads and beating against said hub.

10. The nozzle of claim 1 wherein said means securing each thimble tube in an aperture in said rod ejection plate comprises a circumferential groove in said aperture, a tubular insert having a free end insertable in said aperture and an opposite end fixed to said thimble tube, said insert having at least two circumferentially spaced slots extending generally axially from said free end forming at least two fingers, and an annular bulge extending outwardly around said fingers, said fingers being bent radially inwardly such that said free end of said insert is freely insertable into and removable from said apertures in said rod ejection plate to align said annular bulge with said circumferential groove, and a lock robe insertable through said support tube and into said insert for expanding said fingers outward and engaging said annular bulge in said circumferential groove to removably lock said nozzle to said thimble tubes.

11. The nozzle of claim 10 wherein said fingers are flared outward at the free end of each insert to provide a lead-in for said lock tube.

* * * * *